United States Patent
Lo et al.

(10) Patent No.: US 8,988,332 B2
(45) Date of Patent: Mar. 24, 2015

(54) PIXEL STRUCTURE AND CORRESPONDING LIQUID CRYSTAL DISPLAY DEVICE

(75) Inventors: Shih-Hsun Lo, Guangdong (CN); Bing Han, Guangdong (CN)

(73) Assignee: Shenzhen China Star Optoelectronics Technology Co., Ltd., Guangdong (CN)

(*) Notice: Subject to any disclaimer, the term of this patent is extended or adjusted under 35 U.S.C. 154(b) by 170 days.

(21) Appl. No.: 13/638,886

(22) PCT Filed: Jul. 25, 2012

(86) PCT No.: PCT/CN2012/079157
§ 371 (c)(1),
(2), (4) Date: Oct. 1, 2012

(87) PCT Pub. No.: WO2014/012268
PCT Pub. Date: Jan. 23, 2014

(65) Prior Publication Data
US 2014/0022147 A1  Jan. 23, 2014

(30) Foreign Application Priority Data
Jul. 18, 2012 (CN) .......................... 2012 1 0248559

(51) Int. Cl.
*G09G 3/36* (2006.01)
*G02F 1/1343* (2006.01)
*G02F 1/1362* (2006.01)
*G02F 1/1337* (2006.01)

(52) U.S. Cl.
CPC ............ *G09G 3/36* (2013.01); *G02F 1/133753* (2013.01); *G02F 1/134309* (2013.01); *G02F 1/136213* (2013.01); *G02F 1/136286* (2013.01); *G09G 2300/0426* (2013.01)
USPC ............................................................. 345/87

(58) Field of Classification Search
CPC ............... G09G 3/36; G09G 2300/02; G09G 2300/0421; G09G 2300/0426
USPC ............................................................. 345/87
See application file for complete search history.

(56) References Cited

U.S. PATENT DOCUMENTS

| | | | |
|---|---|---|---|
| 6,885,148 B2* | 4/2005 | Yudasaka | 313/504 |
| 8,610,866 B2* | 12/2013 | Jung et al. | 349/144 |
| 8,643,802 B2* | 2/2014 | Ting et al. | 349/48 |
| 2003/0067579 A1* | 4/2003 | Inoue et al. | 349/187 |
| 2007/0268434 A1* | 11/2007 | Huang et al. | 349/129 |
| 2010/0066934 A1* | 3/2010 | Kim et al. | 349/39 |
| 2011/0222004 A1* | 9/2011 | Kim | 349/106 |
| 2012/0019754 A1* | 1/2012 | Ting et al. | 349/123 |
| 2013/0002625 A1* | 1/2013 | Liao et al. | 345/205 |

* cited by examiner

*Primary Examiner* — Christopher E Leiby
(74) *Attorney, Agent, or Firm* — Kirton McConkie; Evan R. Witt

(57) ABSTRACT

Disclosed are a pixel structure and a corresponding liquid crystal display device. The pixel structure comprises a plurality of pixel electrodes, a plurality of data lines, a plurality of scan lines, and a plurality of common electrodes. The common electrodes are disposed in a plurality of first metal trunk areas corresponding to a plurality of pixel electrode vertical trunk areas of trunk electrodes and/or gap areas between two adjacent pixel areas of a first metal layer. The pixel structure and the corresponding liquid crystal display device of the present invention are capable of increasing an aperture ratio of the pixel structure.

16 Claims, 6 Drawing Sheets

PIXEL STRUCTURE AND CORRESPONDING LIQUID CRYSTAL DISPLAY DEVICE

BACKGROUND OF THE INVENTION

1. Field of the Invention

The present invention generally relates to a liquid crystal display field, and more particularly to a pixel structure and a liquid crystal display device having a high aperture ratio.

2. Description of Prior Art

Currently, a panel size of a liquid crystal display panel is getting larger and larger, and requirements for a wide angle and low energy consumption of the liquid crystal display panel are getting higher and higher, so that a design of pixel structure of the liquid crystal display panel is developed variously.

Each pixel structure of the liquid crystal display panel comprises storage capacitors disposed therein. The storage capacitors are utilized for keeping voltages for driving liquid crystal molecules to be rotated. Capacitance values of the storage capacitors should be designed according to a pixel size. When the capacitance values of the storage capacitors are too small, the voltages of driving the liquid crystal molecules cannot be kept and thus image flicker phenomenon occurs. When the capacitance values of the storage capacitors are too large, an undesirable charging time is increased or the storage capacitors cannot be charged sufficiently. As a result, rotating speeds or rotating angles of the liquid crystal molecules are affected.

Please refer to FIG. 1. FIG. 1 shows a structural diagram of a conventional pixel structure. The pixel structure comprises data lines 11, scan lines 12, thin film field effect transistors 13, pixel electrodes 14 and common electrodes 15. The data lines 11 and the scan lines 12 are crossed with each other for forming a plurality of pixel areas. The storage capacitors of the pixel structure are constituted of the common electrodes 15 and the pixel electrodes 14. When the conventional pixel structure is utilized, the aperture ratio of the pixel structure is affected because the common electrodes 15 which are disposed in edges of the pixel areas are opaque metal electrodes.

Consequently, there is a need to provide a pixel structure and a corresponding liquid crystal display device for solving the problems in the prior arts.

SUMMARY OF THE INVENTION

An objective of the present invention is to provide a pixel structure and a corresponding liquid crystal display device which are capable of increasing an aperture ratio for solving the technical problem of the low aperture ratio of the pixel structure and the corresponding liquid crystal display device in the prior arts.

To solve the above-mentioned problem, a technical scheme provided by the present invention is as the following.

The present invention relates to a pixel structure, which has a plurality of pixel areas, and the pixel structure comprises:

a plurality of pixel electrodes disposed in a pixel electrode layer corresponding to the pixel areas, each pixel electrode comprising a trunk electrode which is cross-shaped and a plurality of branch electrodes extending from the trunk electrode;

a plurality of data lines for transmitting data signals for the corresponding pixel electrodes;

a plurality of scan lines for transmitting scan signals for the corresponding pixel electrodes; and a plurality of common electrodes disposed in a first metal layer corresponding to the pixel areas;

a first insulating layer disposed between the pixel electrode layer and the first metal layer for separating the pixel electrode layer and the first metal layer;

the trunk electrodes disposed in a plurality of pixel electrode horizontal trunk areas and a plurality of pixel electrode vertical trunk areas of the pixel electrode layer, a plurality of first metal trunk areas of the first metal layer corresponding to the pixel electrode vertical trunk areas;

the common electrodes disposed in the first metal trunk areas and gap areas between two adjacent pixel areas of the first metal layer.

In the pixel structure of the present invention, the scan lines are disposed in a second metal layer corresponding to the pixel areas, a second insulating layer is disposed between the first metal layer and the second metal layer for separating the first metal layer and the second metal layer; a plurality of second metal trunk areas of the second metal layer are corresponding to the pixel electrode horizontal trunk areas, and the scan lines are disposed in the second metal trunk areas.

In the pixel structure of the present invention, the data lines are disposed in areas excluding the gap areas.

In the pixel structure of the present invention, when the common electrodes are disposed in the gap areas of the first metal layer between the two adjacent pixel areas, the common electrodes are parallel with the scan lines and guided out in a direction parallel with the scan lines, and two adjacent common electrodes in the direction parallel with the scan lines are directly coupled together via the first metal layer.

In the pixel structure of the present invention, when the common electrodes are disposed in the gap areas of the first metal layer between the two adjacent pixel areas, the common electrodes are parallel with the scan lines and guided out in a direction parallel with the scan lines, two adjacent common electrodes in the direction parallel with the scan lines are coupled together via a transparent electrode layer between the two adjacent pixel areas, and the first metal layer is coupled to the transparent electrode layer via a contact hole.

The present invention further relates to a pixel structure, which has a plurality of pixel areas, and the pixel structure comprises:

a plurality of pixel electrodes disposed in a pixel electrode layer corresponding to the pixel areas, each pixel electrodes comprising a trunk electrode which is cross-shaped and a plurality of branch electrodes extending from the trunk electrode;

a plurality of data lines for transmitting data signals for the corresponding pixel electrodes;

a plurality of scan lines for transmitting scan signals for the corresponding pixel electrodes; and a plurality of common electrodes disposed in a first metal layer corresponding to the pixel areas;

a first insulating layer disposed between the pixel electrode layer and the first metal layer for separating the pixel electrode layer and the first metal layer;

the trunk electrodes disposed in a plurality of pixel electrode horizontal trunk areas and a plurality of pixel electrode vertical trunk areas of the pixel electrode layer, a plurality of first metal trunk areas of the first metal layer corresponding to the pixel electrode vertical trunk areas;

the common electrodes disposed in gap areas between two adjacent pixel areas of the first metal layer.

In the pixel structure of the present invention, the scan lines are disposed in a second metal layer corresponding to the pixel areas, a second insulating layer is disposed between the first metal layer and the second metal layer for separating the first metal layer and the second metal layer; a plurality of second metal trunk areas of the second metal layer are corresponding to the pixel electrode horizontal trunk areas, and the scan lines are disposed in the second metal trunk areas.

In the pixel structure of the present invention, the data lines are disposed in areas excluding the gap areas.

In the pixel structure of the present invention, when the common electrodes are disposed in the gap areas of the first metal layer between the two adjacent pixel areas, the common electrodes are parallel with the scan lines and guided out in a direction parallel with the scan lines, and two adjacent common electrodes in the direction parallel with the scan lines are directly coupled together via the first metal layer.

In the pixel structure of the present invention, when the common electrodes are disposed in the gap areas of the first metal layer between the two adjacent pixel areas, the common electrodes are parallel with the scan lines and guided out in a direction parallel with the scan lines, two adjacent common electrodes in the direction parallel with the scan lines are coupled together via a transparent electrode layer between the two adjacent pixel areas, and the first metal layer is coupled to the transparent electrode layer via a contact hole.

The present invention further relates to a liquid crystal display device, which comprises an array substrate and a color filter substrate disposed opposite to the array substrate, a pixel structure having a plurality of pixel areas is disposed on the array substrate, and the pixel structure comprises:

a plurality of pixel electrodes disposed in a pixel electrode layer corresponding to the pixel areas, each pixel electrode comprising a trunk electrode which is cross-shaped and a plurality of branch electrodes extending from the trunk electrode;

a plurality of data lines for transmitting data signals for the corresponding pixel electrodes;

a plurality of scan lines for transmitting scan signals for the corresponding pixel electrodes; and a plurality of common electrodes disposed in a first metal layer corresponding to the pixel areas;

a first insulating layer disposed between the pixel electrode layer and the first metal layer for separating the pixel electrode layer and the first metal layer;

the trunk electrodes disposed in a plurality of pixel electrode horizontal trunk areas and a plurality of pixel electrode vertical trunk areas of the pixel electrode layer, a plurality of first metal trunk areas of the first metal layer corresponding to the pixel electrode vertical trunk areas;

the common electrodes disposed in the first metal trunk areas.

In the liquid crystal display device of the present invention, the common electrodes are further disposed in gap areas between two adjacent pixel areas of the first metal layer.

In the liquid crystal display device of the present invention, the scan lines are disposed in a second metal layer corresponding to the pixel areas, a second insulating layer is disposed between the first metal layer and the second metal layer for separating the first metal layer and the second metal layer; a plurality of second metal trunk areas of the second metal layer are corresponding to the pixel electrode horizontal trunk areas, and the scan lines are disposed in the second metal trunk areas.

In the liquid crystal display device of the present invention, the data lines are disposed in areas excluding the gap areas.

In the liquid crystal display device of the present invention, when the common electrodes are disposed in the gap areas of the first metal layer between the two adjacent pixel areas, the common electrodes are parallel with the scan lines and guided out in a direction parallel with the scan lines, and two adjacent common electrodes in the direction parallel with the scan lines are directly coupled together via the first metal layer.

In the liquid crystal display device of the present invention, when the common electrodes are disposed in the gap areas of the first metal layer between the two adjacent pixel areas, the common electrodes are parallel with the scan lines and guided out in a direction parallel with the scan lines, two adjacent common electrodes in the direction parallel with the scan lines are coupled together via a transparent electrode layer, and the first metal layer is coupled to the transparent electrode layer via a contact hole.

Compared with the pixel structure and the corresponding liquid crystal display device in the prior arts, the pixel structure and the corresponding liquid crystal display device are capable of increasing the aperture ratio of the pixel structure for solving the technical problem of the low aperture ratio of the pixel structure and the corresponding liquid crystal display device in the prior arts.

For a better understanding of the aforementioned content of the present invention, preferable embodiments are illustrated in accordance with the attached figures for further explanation:

Figure 1:
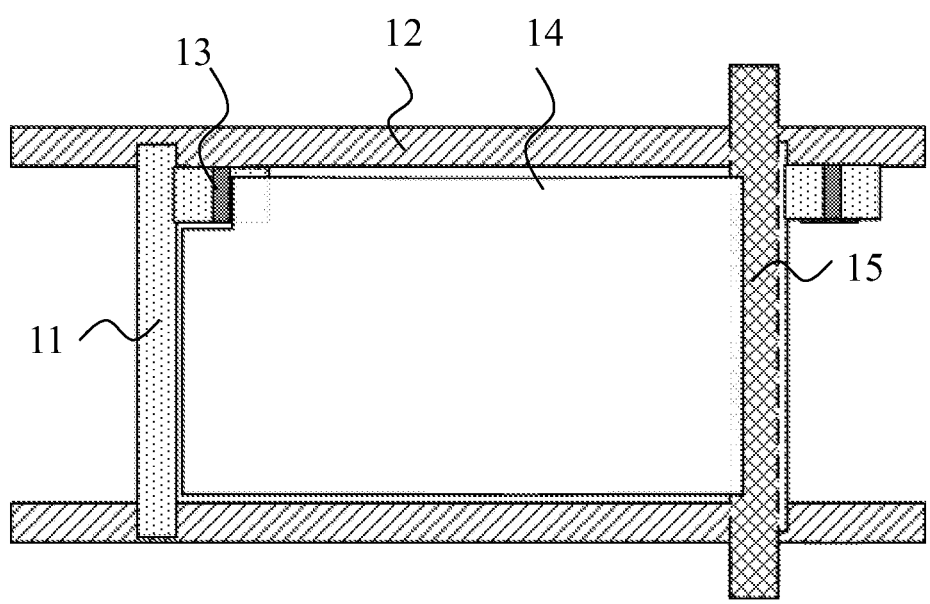
FIG. 1 shows a structural diagram of a conventional pixel structure.

Numerals in the appended figures are described as the following:
21: pixel electrodes
211: trunk electrodes
212: branch electrodes
22: data lines
23: scan lines
24: common electrodes
31: pixel electrode layer
311: pixel electrode horizontal trunk areas
312: pixel electrode vertical trunk areas
32: first metal layer
33: second metal layer
34: first insulating layer
35: second insulating layer
41: transparent electrode layer
42: contact hole.

DETAILED DESCRIPTION OF THE INVENTION

The following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In the appended figures, elements having similar structures are represented as the same numeral.

Figure 2A:
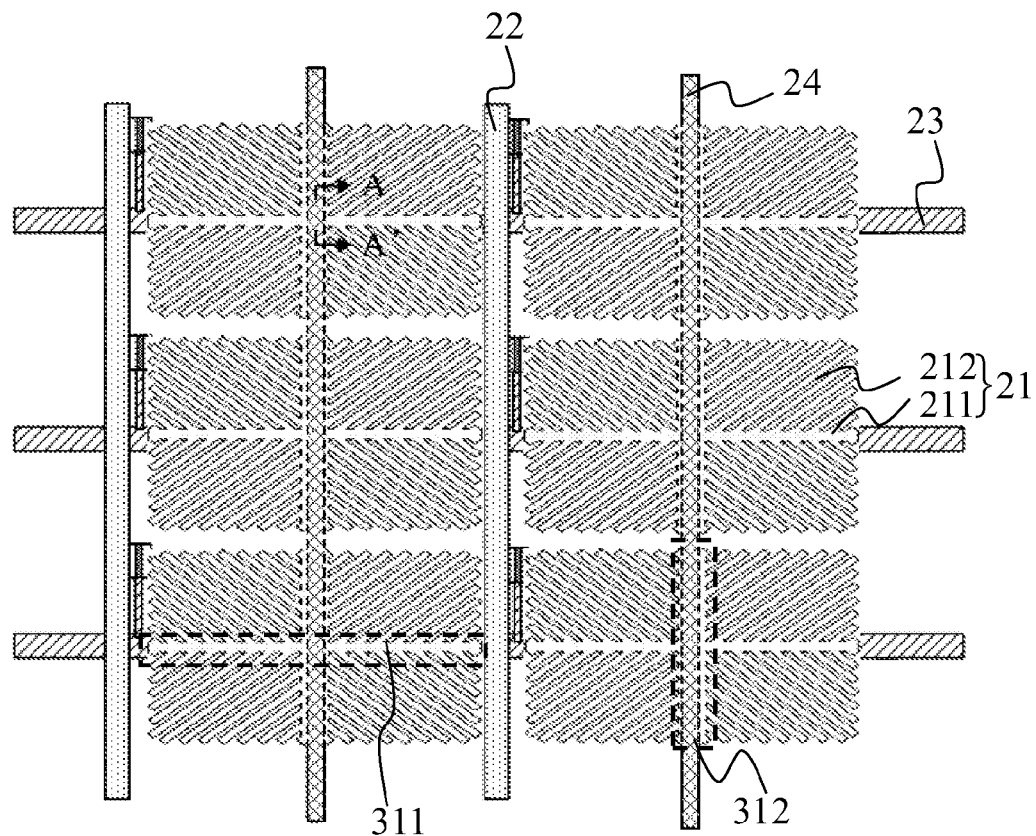
FIG. 2A shows a structural diagram of a pixel structure according to a first preferable embodiment of the present invention.
Figure 2B:
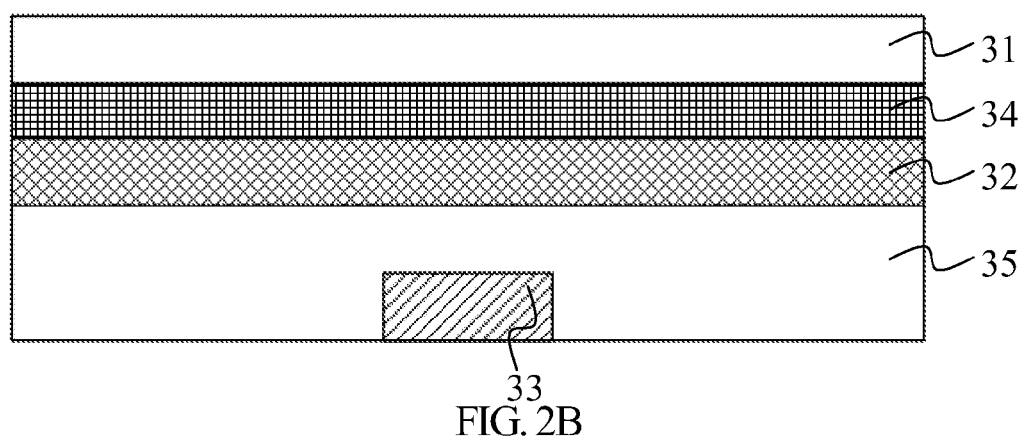
FIG. 2B shows a cross-sectional diagram along a sectional line A-A' in FIG. 2A.

Please refer to FIG. 2A and FIG. 2B. FIG. 2A shows a structural diagram of a pixel structure according to a first preferable embodiment of the present invention. FIG. 2B shows a cross-sectional diagram along a sectional line A-A' in FIG. 2A. The pixel structure has a plurality of pixel areas. The pixel structure comprises a plurality of pixel electrodes 21, a plurality of data lines 22, a plurality of scan lines 23, and a plurality of common electrodes 24. The pixel electrodes 21 are disposed in a pixel electrode layer 31 corresponding to the pixel areas. Each pixel electrode 21 comprises a trunk electrode 211 and a plurality of branch electrodes 212. The trunk electrode 211 is cross-shaped. The branch electrodes 212 extend from the trunk electrode 211. The branch electrodes 212 in different areas have different extending directions, such that each of the pixel areas is divided into a plurality of subareas. The same data signal has different effects on rotating directions of liquid crystal molecules in the different subareas, and thus a viewing angle of a liquid crystal display device may be enlarged. The data lines 22 are utilized for transmitting data signals for the corresponding pixel electrodes 21. The scan lines 23 are utilized for transmitting scan signals for the corresponding pixel electrodes 21. The common electrodes 24 are disposed in a first metal layer 32 corresponding to the pixel areas. The scan lines 23 are disposed in a second metal layer 33 corresponding to the pixel areas.

Figure 2C:
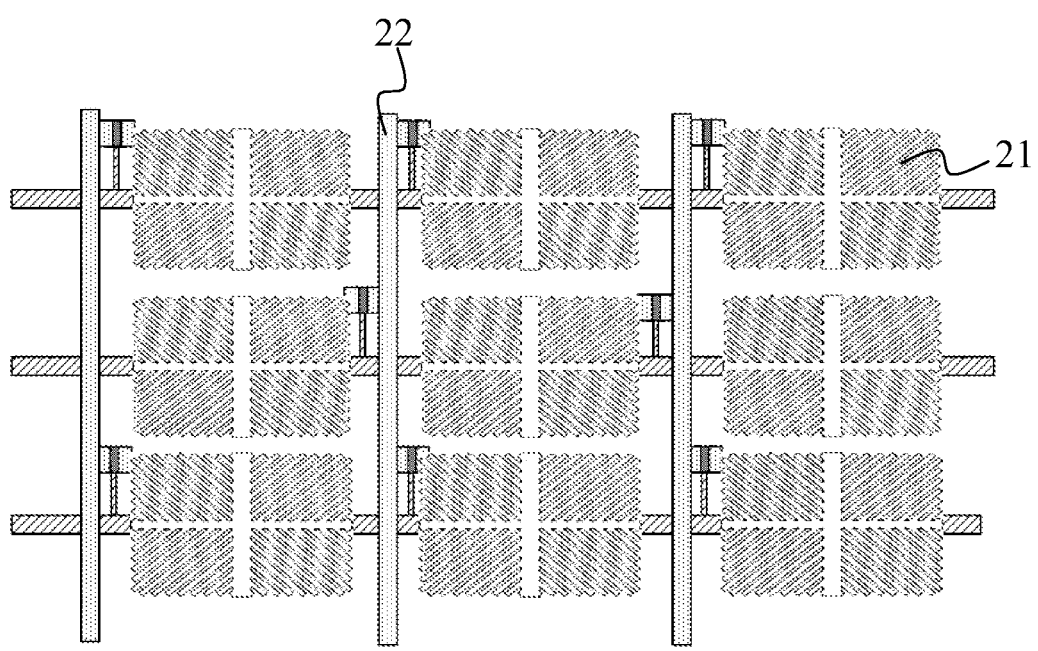
FIG. 2C shows a connection diagram of the data lines and the pixel electrodes.

The pixel electrode layer 31 and the first metal layer 32 are separated by a first insulating layer 34. The first metal layer 32 and the second metal layer 33 are separated by a second insulating layer 35. The trunk electrodes 211 are disposed in a plurality of pixel electrode horizontal trunk areas 311 and a plurality of pixel electrode vertical trunk areas 312 of the pixel electrode layer 31. The common electrodes 24 are disposed in a plurality of first metal trunk areas of the first metal layer 32. The scan lines 23 are disposed in a plurality of second metal trunk areas of the second metal layer 33. The first metal trunk areas of the first metal layer 32 are corresponding to the pixel electrode vertical trunk areas 312 of the pixel electrode layer 31. The second metal trunk areas of the second metal layer 33 are corresponding to the pixel electrode horizontal trunk areas 311 of the pixel electrode layer 31. As shown in FIG. 2A and FIG. 2B, the first metal trunk areas of the first metal layer 32 and the pixel electrode vertical trunk areas 312 of the pixel electrode layer 31 basically overlap in the pixel areas. The second metal trunk areas and the pixel electrode horizontal areas basically overlap in the pixel areas. Herein, there are several position relationships between the data lines 22 and the pixel electrodes 21 coupled to the corresponding data lines 22. The position relationships may be disposed according to different driving methods. One example of a connection diagram of the data lines and the pixel electrodes is shown in FIG. 2C. The connection in FIG. 2C shows only that the data lines 22 transmit the data signals for the corresponding pixel electrodes 21. The connection does not limit the connection relationship between one specific data line 22 and one specific pixel electrode 21.

The data lines 22 of the pixel structure of the present embodiment are disposed according to the conventional pixel structure. The scan lines 23 are disposed in the second metal trunk areas. The second metal trunk areas and the pixel electrode horizontal trunk areas 311 basically overlap. That is, positions of the scan lines 23 in the pixel areas and positions of the pixel trunks 211 in the pixel areas basically overlap. Since a liquid crystal orientation of the trunk electrodes 211 in the pixel areas extends along an extending direction of the trunk electrodes 211, a polarization direction of light in the pixel areas is the same as that of an upper polarizer or a lower polarizer. A light transmittance of the trunk electrodes 211 in the pixel areas is zero. Accordingly, disposing the scan lines 23 which are opaque in the second metal trunk areas instead of in edges of pixel areas may decrease influence on an aperture ratio of the pixel areas.

In the present embodiment, the common electrodes 24 are disposed in the first metal trunk areas. The first metal trunk areas and the pixel electrode vertical trunk areas 312 basically overlap. That is, positions of the common electrodes 24 in the pixel areas and positions of the trunk electrodes 211 in the pixel areas basically overlap. Storage capacitors are formed between the common electrodes 24 and the pixel electrodes 21 for ensuring voltage potentials of the pixel electrodes 21. Disposing the common electrodes 24 which are opaque does not affect the aperture ratio of the pixel areas on a basis of implementing the storage capacitors. Meanwhile, disposing areas of the common electrodes 24 in the pixel areas are separated from disposing areas of the data lines 22 and disposing areas of the scan lines 23, so that signals of the data lines 22 and the scan lines 23 do not interfere the common electrodes 24 and the common electrodes 24 may work stably.

Figure 3A:
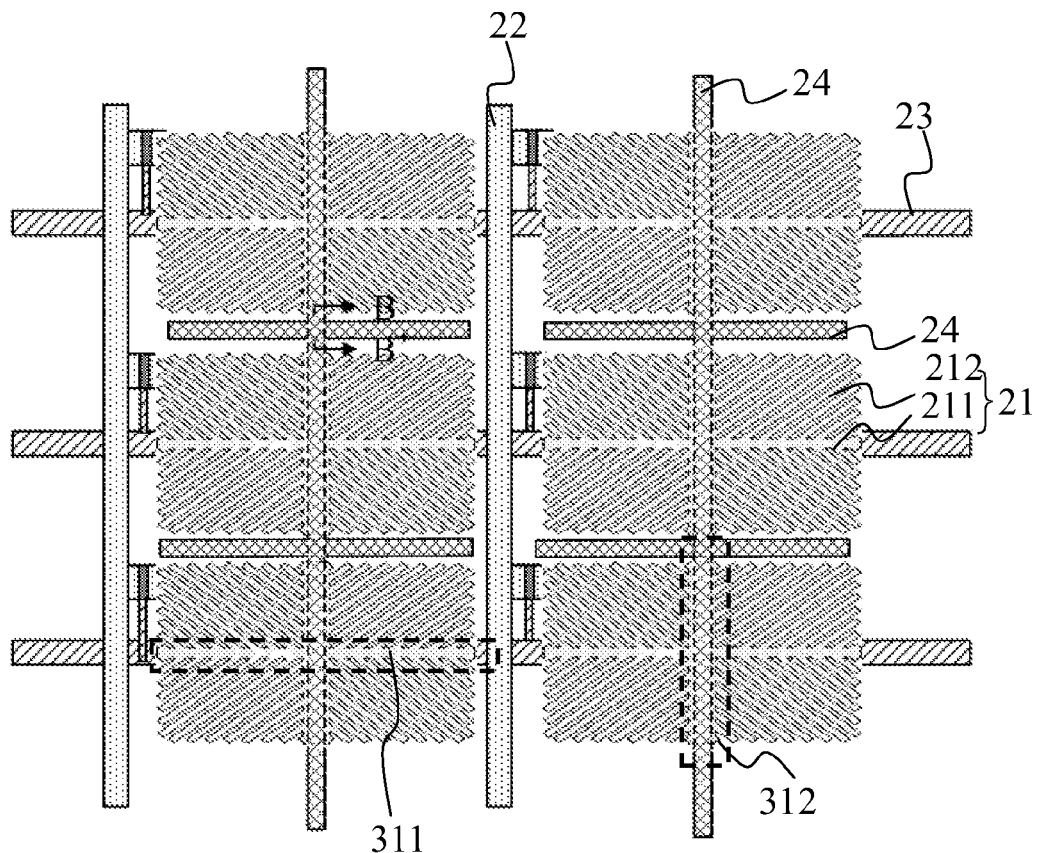
FIG. 3A shows a structural diagram of a pixel structure according to a second preferable embodiment of the present invention.
Figure 3B:
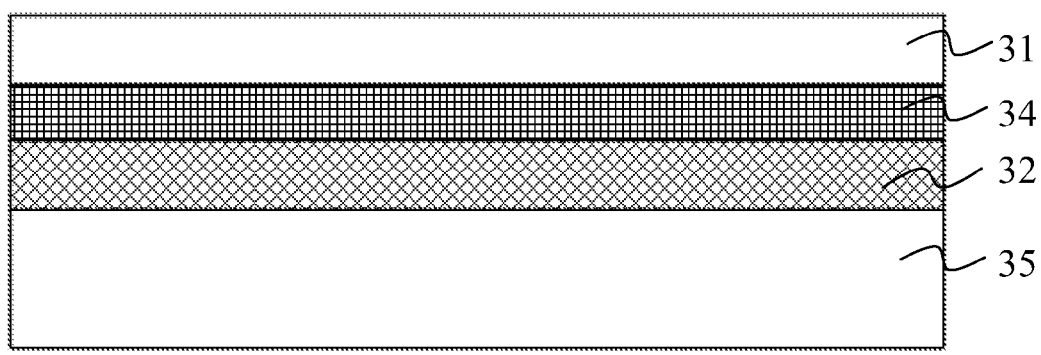
FIG. 3B shows a cross-sectional diagram along a sectional line B-B' in FIG. 3A.

Please refer to FIG. 3A. FIG. 3A shows a structural diagram of a pixel structure according to a second preferable embodiment of the present invention. FIG. 3B shows a cross-sectional diagram along a sectional line B-B' in FIG. 3A. A difference between the present embodiment and the first embodiment is that the common electrodes 24 are disposed in the first metal trunk areas of the first metal layer 32 and gap areas between two adjacent pixel areas of the first metal layer 32. As shown in FIG. 3A and FIG. 3B, the common electrodes 24 disposed in the first metal trunk areas are parallel with the data lines 22. The common electrodes 24 disposed in the gap areas between the two adjacent pixel areas of the first metal layer 32 are parallel with the scan lines 23. The common electrodes 24 in the first metal trunk areas and the common electrodes 24 in the gap areas between the two adjacent pixel areas are coupled together. The data lines 22 are disposed in areas excluding the above-mentioned gap areas.

In the present embodiment, the common electrodes 24 which are opaque are further disposed the gap areas between the two adjacent pixel areas, and the data lines 23 and the scan lines 22 are not disposed in the gap areas. Accordingly, on the basis of implementing the storage capacitors, the aperture ratio of the pixel areas is not affected or the influence on the aperture ratio of the pixel areas is not much. Meanwhile, the disposing areas of the common electrodes 24 in the pixel areas are separated from the disposing areas of the data lines 22 and the disposing areas of the scan lines 23, so that the signals of the data lines 22 and the scan lines 23 do not interfere the common electrodes 24 and the common electrodes 24 may work stably.

Figure 4A:
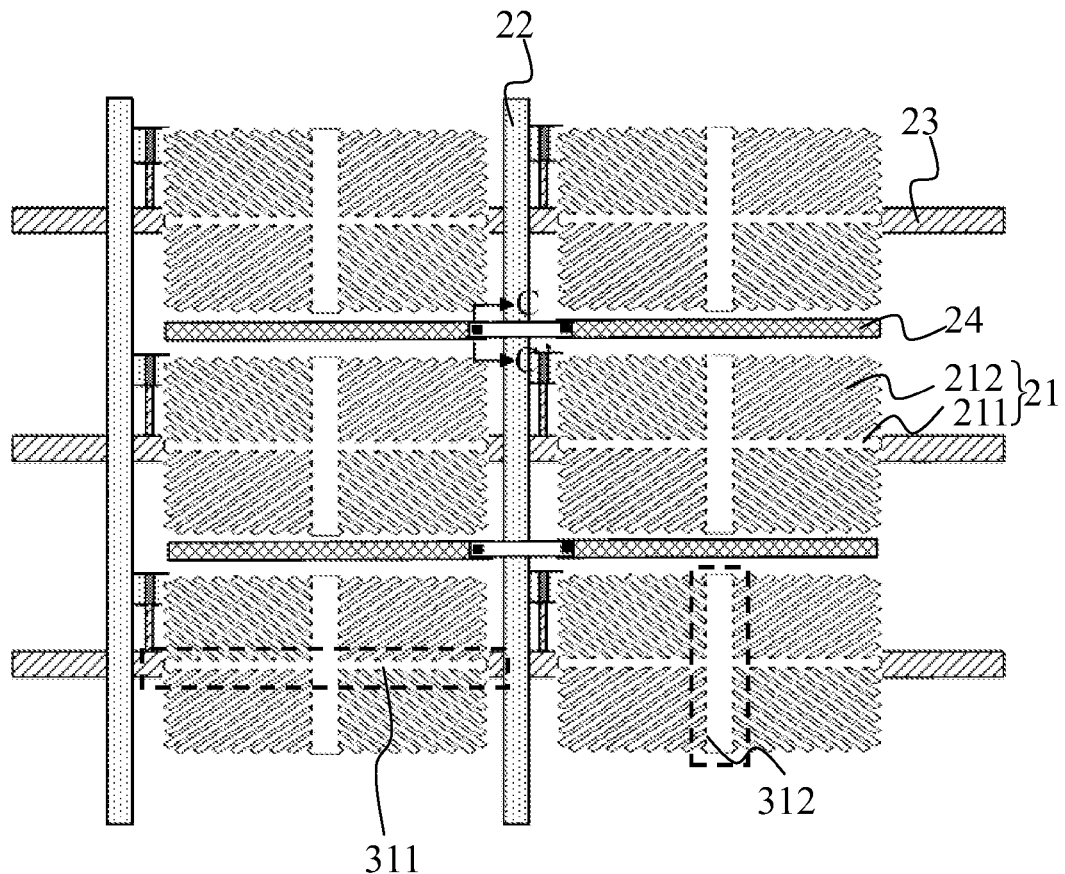
FIG. 4A shows a structural diagram of a pixel structure according to a third preferable embodiment of the present invention.
Figure 4B:
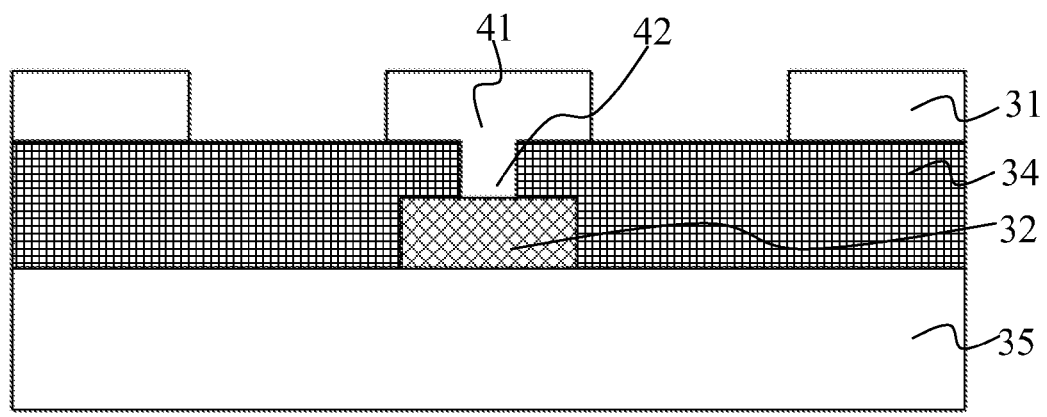
FIG. 4B shows a cross-sectional diagram along a sectional line C-C' in FIG. 4A.

Please refer to FIG. 4A and FIG. 4B. FIG. 4A shows a structural diagram of a pixel structure according to a third preferable embodiment of the present invention. FIG. 4B shows a cross-sectional diagram along a sectional line C-C' in FIG. 4A. A difference between the present embodiment and the first embodiment is that the common electrodes 24 are disposed only in the gap areas between the two adjacent pixel areas of the first metal layer 32. As shown in FIG. 4A and FIG. 4B, the common electrodes 24 disposed in the gap areas between two adjacent pixel areas of the first metal layer 32 are parallel with the scan lines 23 and guided out in a direction parallel with the scan lines 23. The data lines 22 are disposed in areas excluding the above-mentioned gap areas.

In the present embodiment, two adjacent common electrodes 24 in the direction parallel with the scan lines 23 are coupled via a transparent electrode layer 41 between the two adjacent pixel areas. The first metal layer 32 is coupled to the transparent electrode layer 41 via a contact hole 42. The common electrodes 24 which are opaque are disposed in the gap areas between the two adjacent pixel areas, and the data lines 23 and the scan lines 22 are not disposed in the gap areas. Accordingly, on the basis of implementing the storage capacitors, the aperture ratio of the pixel areas is not affected or the influence on the aperture ratio of the pixel areas is not much. Meanwhile, the disposing areas of the common electrodes 24 in the pixel areas are separated from the disposing areas of the data lines 22 and the disposing areas of the scan lines 23, so that the signals of the data lines 22 and the scan lines 23 do not interfere the common electrodes 24 and the common electrodes 24 may work stably. Furthermore, cost of coupling the two adjacent common electrodes 24 in the present embodiment is lower.

Figure 5A:
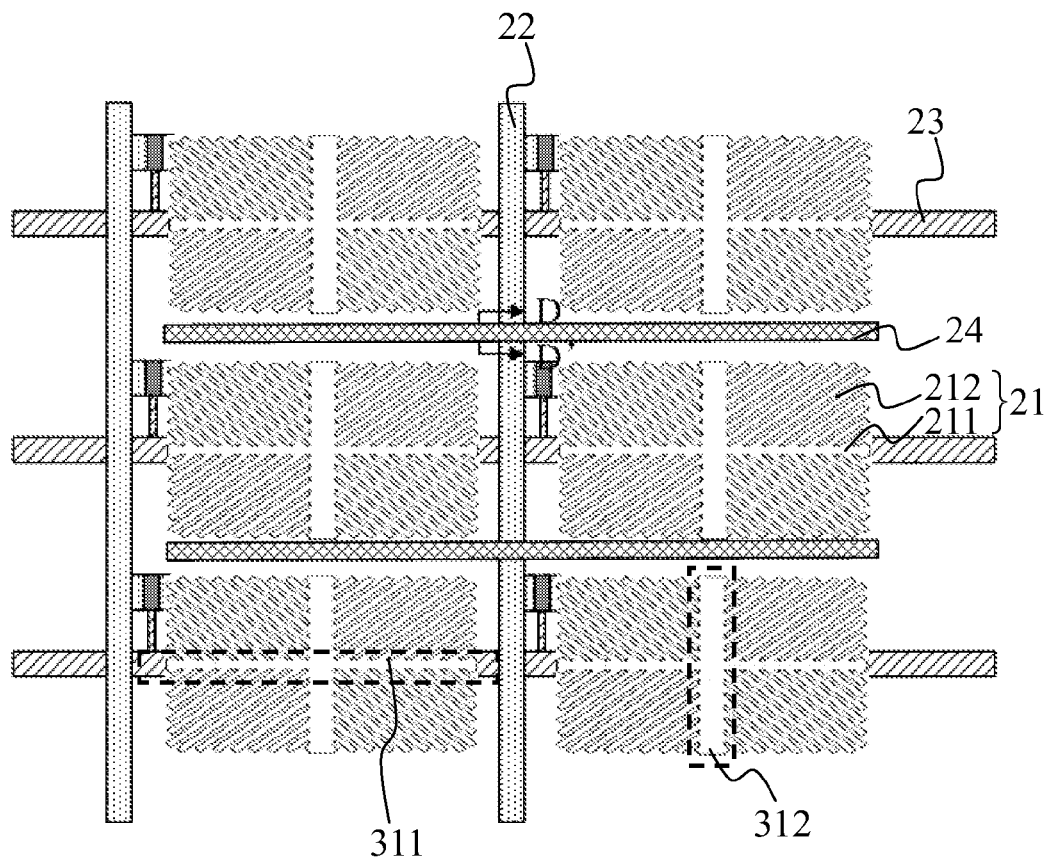
FIG. 5A shows a structural diagram of a pixel structure according to a fourth preferable embodiment of the present invention
Figure 5B:
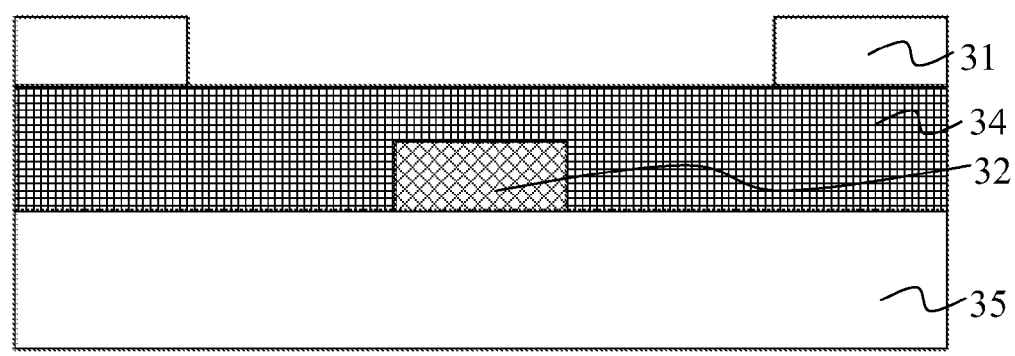
FIG. 5B shows a cross-sectional diagram along a sectional line D-D' in FIG. 5A.

Please refer to FIG. 5A and FIG. 5B. FIG. 5A shows a structural diagram of a pixel structure according to a fourth preferable embodiment of the present invention. FIG. 5B shows a cross-sectional diagram along a sectional line D-D' in FIG. 5A. The common electrodes 24 disposed in the gap areas between the two adjacent pixel areas of the first metal layer 32 are parallel with the scan line 23 and guided out in the direction parallel with the scan lines 23. The data lines 22 are disposed in the areas excluding the above-mentioned gap areas. A difference between the present embodiment and the third embodiment is that the two adjacent common electrodes 24 in the direction parallel with the scan lines 23 are directly coupled via the first metal layer 32.

In the present embodiment, the common electrodes 24 which are opaque are disposed in the gap areas between the two adjacent pixel areas, and the data lines 23 and the scan lines 22 are not disposed in the gap areas. Accordingly, on the basis of implementing the storage capacitors, the aperture ratio of the pixel areas is not affected or the influence on the aperture ratio of the pixel areas is not much. Meanwhile, the disposing areas of the common electrodes 24 in the pixel areas are separated from the disposing areas of the data lines 22 and the disposing areas of the scan lines 23, so that the signals of the data lines 22 and the scan lines 23 do not interfere the common electrodes 24 and the common electrodes 24 may work stably. Furthermore, the common electrodes 24 are coupled together via the first metal layer 32, connections of the common electrodes 24 are more stable.

The present invention further relates to a liquid crystal display device. The liquid crystal display device comprises an array substrate and a color filter substrate disposed opposite to the array substrate. A pixel structure having a plurality of pixel areas is disposed on the array substrate. The pixel structure comprises a plurality of pixel electrodes, a plurality of data lines, a plurality of scan lines, and a plurality of common electrodes. The pixel electrodes are disposed in a pixel electrode layer corresponding to the pixel areas. Each of the pixel electrodes comprises a trunk electrode and a plurality of branch electrodes. The trunk electrode is cross-shaped. The branch electrodes extend from the trunk electrode. The branch electrodes in different areas have different extending directions. The data lines are utilized for transmitting data signals for the corresponding pixel electrodes. The scan lines are utilized for transmitting scan signals for the corresponding pixel electrodes. The common electrodes are disposed in a first metal layer corresponding to the pixel areas. The scan lines are disposed in a second metal layer corresponding to the pixel areas.

The pixel electrode layer and the first metal layer are separated by a first insulating layer. The first metal layer and the second metal layer are separated by a second insulating layer. The trunk electrodes are disposed in a plurality of pixel electrode horizontal trunk areas and a plurality of pixel electrode vertical trunk areas of the pixel electrode layer. The common electrodes are disposed in a plurality of first metal trunk areas of the first metal layer. The scan lines are disposed in a plurality of second metal trunk areas of the second metal layer. The first metal trunk areas of the first metal layer are corresponding to the pixel electrode vertical trunk areas of the pixel electrode layer. The second metal trunk areas of the second metal layer are corresponding to the pixel electrode horizontal trunk areas of the pixel electrode layer.

Meanwhile, the common electrodes of the liquid crystal display device of the present invention may be disposed in gap areas between two adjacent pixel areas of the first metal layer by several methods. The common electrodes disposed in the gap areas between the two adjacent pixel areas of the first metal layer are parallel with the scan lines and guided out in a direction parallel with the scan lines. The data lines are disposed in areas excluding the gap areas. If the common electrodes are disposed in both the first metal trunk areas and the gap areas, the common electrodes in these two areas are coupled together via the first metal layer.

Embodiments and benefit of the liquid crystal display device of the present invention are the same as or similar to those of the above-mentioned pixel structure and may be referred to the embodiments of the above-mentioned pixel structure.

The pixel structure and the corresponding liquid crystal display device of the present invention are capable of increasing the aperture ratio of the pixel structure for solving the problem of the low aperture ratio of the pixel structure and the corresponding liquid crystal display device in the prior arts.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A pixel structure, having a plurality of pixel areas, the pixel structure comprising:
    a plurality of pixel electrodes disposed in a pixel electrode layer corresponding to the pixel areas, each pixel electrode comprising a trunk electrode which is cross-shaped and a plurality of branch electrodes extending from the trunk electrode, each trunk electrode including a horizontal portion that extends within a corresponding horizontal trunk area of the pixel electrode layer and a vertical portion that extends within a corresponding vertical area of the pixel electrode layer;
    a plurality of data lines for transmitting data signals for the corresponding pixel electrodes;
    a plurality of common electrodes disposed in a first metal layer corresponding to the pixel areas, the first metal layer being separated from the pixel electrode layer by a first insulating layer, the first metal layer including first metal trunk areas which extend in parallel with the vertical trunk areas of the pixel electrode layer such that the plurality of common electrodes are positioned underneath and extend in parallel with the vertical portions of the trunk electrodes; and a plurality of scan lines disposed in a second metal layer, the second metal layer being separated from the first metal layer by a second insulating layer, the second metal layer including second metal trunk areas which extend in parallel with the horizontal trunk areas of the pixel electrode layer such that the plurality of scan lines are positioned directly underneath and extend in parallel with the horizontal portions of the trunk electrodes.

2. The pixel structure of claim 1, further comprising:
additional common electrodes that extend in gap areas of the first metal layer, the gap areas being between adjacent pixel areas.

3. The pixel structure of claim 2, wherein the data lines are disposed in areas excluding the gap areas.

4. The pixel structure of claim 3, wherein the additional common electrodes are parallel with the scan lines and guided out in a direction parallel with the scan lines, and two adjacent additional common electrodes are directly coupled together via the first metal layer.

5. The pixel structure of claim 3, wherein the additional common electrodes are parallel with the scan lines and guided out in a direction parallel with the scan lines, two adjacent additional common electrodes are coupled together via a transparent electrode layer between the two adjacent pixel areas, and the first metal layer is coupled to the transparent electrode layer via a contact hole.

6. A pixel structure, having a plurality of pixel areas, the pixel structure comprising:
a plurality of pixel electrodes disposed in a pixel electrode layer corresponding to the pixel areas, each pixel electrodes comprising a trunk electrode which is cross-shaped and a plurality of branch electrodes extending from the trunk electrode, each trunk electrode including a horizontal portion that extends within a corresponding horizontal trunk area of the pixel electrode layer and a vertical portion that extends within a corresponding vertical area of the pixel electrode layer;
a plurality of data lines for transmitting data signals for the corresponding pixel electrodes;
a plurality of common electrodes disposed in a first metal layer corresponding to the pixel areas, the first metal layer being separated from the pixel electrode layer by a first insulating layer, the first metal layer forming gap areas between adjacent pixel areas, the plurality of common electrodes extending within the gap areas; and
a plurality of scan lines disposed in a second metal layer, the second metal layer being separated from the first metal layer by a second insulating layer, the second metal layer including second metal trunk areas which extend in parallel with the horizontal trunk areas of the pixel electrode layer such that the plurality of scan lines are positioned directly underneath and extend in parallel with the horizontal portions of the trunk electrodes.

7. The pixel structure of claim 6, wherein the first metal layer includes first metal trunk areas which extend in parallel with the vertical trunk areas of the pixel electrode layer, further comprising:

additional common electrodes that extend within the first metal trunk areas such that the additional common electrodes are positioned underneath and extend in parallel with the vertical portions of the trunk electrodes.

8. The pixel structure of claim 7, wherein the data lines are disposed in areas excluding the gap areas.

9. The pixel structure of claim 6, wherein two adjacent common electrodes are directly coupled together via the first metal layer.

10. The pixel structure of claim 6, wherein two adjacent common electrodes are coupled together via a transparent electrode layer between the two adjacent pixel areas, and the first metal layer is coupled to the transparent electrode layer via a contact hole.

11. A liquid crystal display device, comprising an array substrate and a color filter substrate disposed opposite to the array substrate, a pixel structure having a plurality of pixel areas disposed on the array substrate, the pixel structure comprising:
a plurality of pixel electrodes disposed in a pixel electrode layer corresponding to the pixel areas, each pixel electrode comprising a trunk electrode which is cross-shaped and a plurality of branch electrodes extending from the trunk electrode, each trunk electrode including a horizontal portion that extends within a corresponding horizontal trunk area of the pixel electrode layer and a vertical portion that extends within a corresponding vertical area of the pixel electrode layer;
a plurality of data lines for transmitting data signals for the corresponding pixel electrodes;
a plurality of common electrodes disposed in a first metal layer corresponding to the pixel areas, the first metal layer being separated from the pixel electrode layer by a first insulating layer; and
a plurality of scan lines disposed in a second metal layer, the second metal layer being separated from the first metal layer by a second insulating layer, the second metal layer including second metal trunk areas which extend in parallel with the horizontal trunk areas of the pixel electrode layer such that the plurality of scan lines are positioned directly underneath and extend in parallel with the horizontal portions of the trunk electrodes.

12. The liquid crystal display device of claim 11, wherein the common electrodes are disposed in gap areas of the first metal layer between two adjacent pixel areas.

13. The liquid crystal display device of claim 12, wherein the first metal layer includes first metal trunk areas which extend in parallel with the vertical trunk areas of the pixel electrode layer, the common electrodes being positioned underneath and extend in parallel with the vertical portions of the trunk electrodes.

14. The liquid crystal display device of claim 12, wherein the data lines are disposed in areas excluding the gap areas.

15. The liquid crystal display device of claim 12, wherein two adjacent common electrodes are directly coupled together via the first metal layer.

16. The liquid crystal display device of claim 12, wherein two adjacent common electrodes are coupled together via a transparent electrode layer, and the first metal layer is coupled to the transparent electrode layer via a contact hole.

* * * * *